Figure 1:
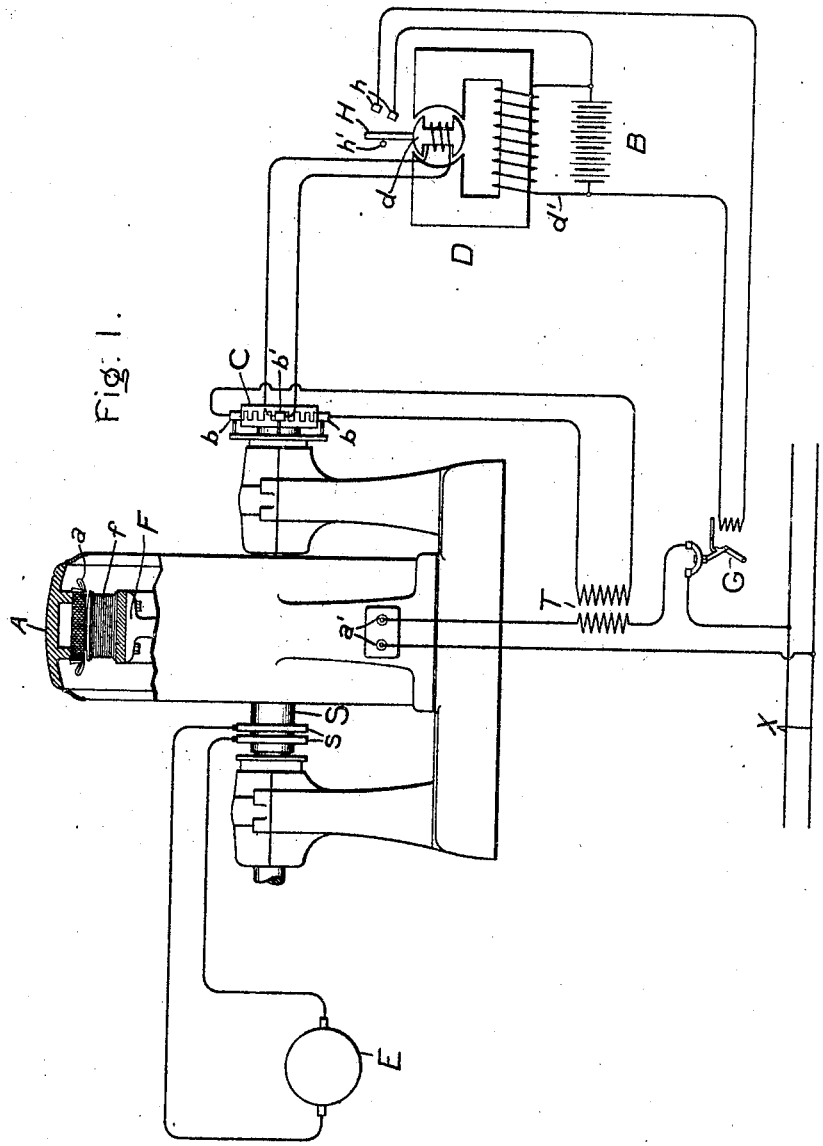

No. 811,265. PATENTED JAN. 30, 1906.
L. WILSON.
PROTECTION AGAINST REVERSAL OF ENERGY.
APPLICATION FILED MAY 2, 1904.

2 SHEETS—SHEET 2.

WITNESSES
Benjamin B. Hull
Helen Orford

INVENTOR
LEONARD WILSON
By Albert G. Davis
ATTY.

UNITED STATES PATENT OFFICE.

LEONARD WILSON, OF PITTSFIELD, MASSACHUSETTS, ASSIGNOR TO STANLEY ELECTRIC MANUFACTURING COMPANY, OF PITTSFIELD, MASSACHUSETTS, A CORPORATION OF NEW JERSEY.

PROTECTION AGAINST REVERSAL OF ENERGY.

No. 811,265.  Specification of Letters Patent.  Patented Jan. 30, 1906.

Application filed May 2, 1904. Serial No. 205,850.

*To all whom it may concern:*

Be it known that I, LEONARD WILSON, a subject of the King of Great Britain, residing at Pittsfield, in the county of Berkshire and State of Massachusetts, have invented certain new and useful Improvements in Protection Against Reversal of Energy, of which the following is a specification.

My invention relates to the protection of alternating-current apparatus against reversal of energy; and its object is to provide more reliable and positive means for such protection than have hitherto been devised. In the case of such alternating-current apparatus—as, for instance, a generator connected to common bus-bars with other generators—a reversal of the flow of energy may occur upon the failure of the apparatus and may result in its damage or destruction, and it is advisable to provide means for opening the circuit of such apparatus when such reversal occurs. To accomplish this end, it has been proposed to employ a reverse-current cut-out operating on the principle of a shunt-motor or wattmeter, the connections of the two windings being such that when the current is in its normal phase relative to the potential a turning movement of the cut-out will be produced in a given direction, while upon a reversal of the current phase relative to the potential a turning movement in the opposite direction, and a consequent operation of the cut-out will be produced. Such an arrangement is shown and described in the United States Letters Patent No. 638,084, issued to Leonard Andrews, November 28, 1899. Although such a cut-out affords adequate protection against a normal flow of reverse current, it is likely to fail upon a reverse current of large amount—as, for instance, upon a short-circuit of the apparatus to be protected. In such a case the potential across the terminals of the apparatus may fall to a very low value, insufficient to furnish the potential coil of the cut-out with the proper amount of current for operation, and even if a certain amount of potential still exists at the terminals of the apparatus a heavy current-flow may so overpower the effect of the potential coil as to render the device inoperative.

By my invention I provide means for the protection of alternating-current apparatus against reversal of energy, which shall be at all times reliable in its action regardless of the drop of potential or amount of reverse-current flow.

My invention will best be understood by reference to the accompanying drawings, in which—

Figure 2:
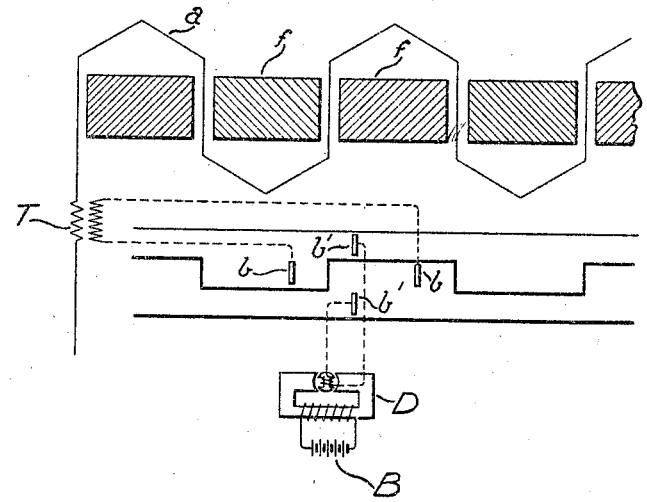

Figure 1 shows an arrangement embodying my invention applied to an alternating-current generator. Fig. 2 is an explanatory diagram showing the means for adjusting the operation of the cut-out device, and Fig. 3 shows a series of curves illustrating the operation of the device.

Referring to Fig. 1, A represents the stationary armature of an alternating-current generator carrying the armature-coils $a$. F represents the revolving field structure, carrying the field-poles $f$ and mounted on the shaft S. $s\,s$ represent collector-rings on shaft S, by means of which current is led to the field-winding from the exciter E or other source of current. The armature-terminals $a'$ of the generator are connected to the mains or bus-bars X. It is evident that if other sources of current are connected to the bus-bars X and if the generator A drops out of synchronism, or if its field-circuit becomes open from any cause, a reversal of energy will take place and current will flow from the bus-bars X to the generator, which, if allowed to continue, may result in the damage or destruction of the generator. Furthermore, as in the case of a failure of the field-circuit, the potential at the generator-terminals may fall to a very small value, since the armature will act as a practical short-circuit across the bus-bars X. For this reason a reverse-current cut-out operating upon the shunt-motor or wattmeter principle is not reliable. Consequently in place of utilizing in any way the potential at the generator-terminals I employ merely the current in the generator-leads and by properly commutating it introduce it into one winding of a direct-current relay. Thus C represents a commutator or rectifier mounted on shaft S, two brushes of which, $b\,b$, are connected to the secondary of a series transformer T, the primary of which is connected in one of the generator-leads. A second set of brushes $b'$ is connected to the winding on the movable element $d$ of the polarized relay D, the other element of which has its winding $d'$ energized from a source of constant current, such as battery B, or, if preferred, this element may be formed of a permanent magnet and the field-winding $d'$ omitted. The movable member $d$ of the relay carries an arm H, which when the movable member $d$ tends to turn in a counter-clockwise direction is restrained by the stop $h'$, but which when the armature $d$ tends to turn in a clockwise direction bridges the contacts $h$, closing a circuit from the battery B through a tripping-coil of a switch G, arranged to open the circuit of the generator.

Figure 3:
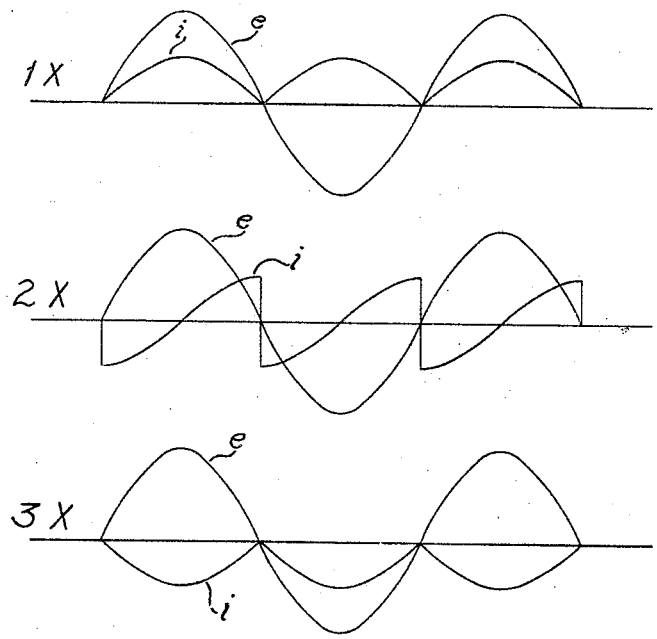

Referring now to Figs. 2 and 3, the action of the commutator will be explained. In Fig. 2, $a$ represents diagrammatically the armature-winding, and $f\ f$ the field-poles. C represents the commutator, which is carried by the shaft and rotates with the field-poles $f$. The two sets of brushes $b\ b$ and $b'\ b'$ are shown connected to the secondary of transformer T and to the armature of relay D, respectively. With the brushes arranged as shown, it is evident that the direction of current through the armature of relay D will be reversed relative to that in transformer T whenever the brushes $b\ b$ pass from one section of the commutator to the other. Moreover, with the brushes fixed in any given position it is evident that the time of this reversal is fixed relative to the position of the field structure, since the commutator revolves with the field structure. Consequently this reversal is fixed relative to the potential induced in the armature-winding $a$, since this potential depends upon the position of the field-poles $f$. If the brushes $b\ b$ are so placed that they pass from one section of the commutator to the other at the instant that the field-poles $f$ are in the position of zero induced electromotive force in the armature-winding A, and if the current in the secondary of transformer T is in phase with or in opposition to the induced electromotive force in winding $a$ the current curve in the armature of relay D may be represented by the curve $i$ in diagram $1^\times$ of Fig. 3, the induced electromotive force in armature $a$ being represented by the curve $e$ in the same figure. That is, the current through the armature of relay D is a pulsating unidirectional current and co-acting with the constant field of the relay will produce a torque in a given direction. Now assuming that the brushes remain fixed in the same position, if the current in the secondary of transformer T is ninety degrees out of phase with the induced electromotive force in the armature $a$ the current curve of the armature of relay D will be represented by the curve $i$ in diagram $2^\times$. The point of commutation of the current is shifted ninety degrees relatively to the current curve from that in diagram $1^\times$ and no torque can be produced in relay D. The same diagram $2^\times$ would also represent the current curve if the current in the secondary of transformer T were of the same phase as in Fig. $1^\times$, but the brushes shifted ninety degrees, or, in other words, the change of the current curve in diagram $2^\times$ may represent either a shifting of the current phase or a shifting of the brushes. Consequently it will be seen that by properly adjusting the brushes the current curve of diagram $1^\times$ may be obtained with any phase relation of the current in the secondary of transformer T to the induced electromotive force in armature-winding $a$. Now assume that the brushes $b\ b$ are properly placed relative to the field-poles $f$, so that diagram $1^\times$ represents the current curve in the armature of relay D when the current in the primary of transformer T, or, in other words, the current in the winding $a$ is in phase with the induced electromotive force, this would be the condition of unity power factor. With the brushes maintained fixed in position diagram $2^\times$ would represent the conditions for zero power factor, and diagram $3^\times$ would represent the conditions for a complete reversal of current—that is, when the current is one hundred and eighty degrees out of phase with the induced electromotive force. In comparing diagrams $1^\times$ and $3^\times$ it will be seen that the current curves in both represent a pulsating unidirectional current; but the direction of current is reversed. Consequently a reversal of current in armature-winding $a$ relative to the potential produces a reversal of the direction of the torque of the armature of relay D and a consequent opening of the generator-circuit by means of the arrangement shown in Fig. 1. It will be seen that the operation of the relay is in no way dependent upon the potential across the terminals of the generator, and consequently its operation is in no way affected by a drop in this potential.

As has been said heretofore, a reverse-current relay of the wattmeter type is subject to the objection not only of failure of current in the potential winding upon a short circuit, but also to a possible overpowering of the potential flux upon the flow of a heavy short-circuit current. A protective device arranged in accordance with my invention is not liable to the first objection, and in order to avoid the second I design the series transformer T, so that it will become saturated at a small fraction of normal full-load current. The amount of current-flow of the secondary of transformer T is consequently limited and can never reach an amount liable to produce a false operation of the relay on an overload or a failure to operate upon a reverse short-circuit current. The employment of a saturated transformer has the further advantage that a practically uniform torque of the device D is obtained over a wide range, thereby enabling the relay to operate upon a comparatively small reverse current, while at the same time being reliable upon a heavy short-circuit current. The use of a saturated series transformer produces a shifting of the relative phases of the currents in its primary and secondary, the currents being no longer nearly one hundred and eighty degrees apart, as in an unsaturated transformer, but little more than ninety degrees apart. This, however, is of no importance, since this shifting of phase may be wholly compensated for simply by shifting the brushes.

In adjusting the brushes it is well to bear in mind that the usual reverse current is not of unity power factor, but is ordinarily about one hundred and fifty degrees out of phase with the electromotive force. This characteristic also may be provided for by properly placing the brushes.

Although I have shown my invention applied to an alternating-current generator, it is in no way limited to this particular application. It may also be utilized with receiving apparatus, such as synchronous motors or rotary converters, to prevent their returning energy to the line upon a failure of the line voltage. My invention is applicable to any alternating-current apparatus which is liable to a reversal of energy when means can be provided for driving a commutator synchronously and in phase with the electromotive force.

Since the function of the commutator is merely to reduce the alternating current from the secondary of the transformer and the direct current from the battery B to the same kind of current, it is obvious that either of the two currents may be commutated. The arrangement shown, however, is the preferred form.

Although I have shown a device D as a relay arranged to close the circuit of the tripping-coil of a switch, my invention is not limited to this particular arrangement. The device D may be directly connected to operate the switch, as in the arrangement shown in United States Letters Patent No. 638,084, heretofore cited. Accordingly I do not desire to limit myself to the particular construction and arrangement here shown, since changes which do not depart from the spirit of my invention will be obvious to those skilled in the art.

What I claim as new, and desire to secure by Letters Patent of the United States, is—

1. In combination, a main alternating-current circuit, a local circuit in which the current varies in phase with variation of phase of the current in the main circuit, a commutator in said local circuit rotating synchronously with the cycles of the electromotive force of the main circuit, a device having relatively movable members and energized both by the commutated current in said local circuit and by a constant flux, and a switch in the main circuit controlled by said device.

2. In combination, a main alternating-current circuit, a local circuit in which the current varies in phase with variation of phase of the current in the main circuit, a commutator in said local circuit rotating synchronously with the cycles of the electromotive force of the main circuit, a device having relatively movable members, one of said members being energized by the commutated current in said local circuit and the other member being energized by a constant flux, and a switch in the main circuit controlled by said device.

3. In combination, an alternating-current dynamo-electric machine, a local circuit in which the current varies in phase with variation of phase of the current in said machine, a commutator in said local circuit rotating with the rotating member of said machine, a device having relatively movable members and energized both by the commutated current in said local circuit and by a constant flux, and a switch in the circuit of said machine controlled by said device.

4. In combination, an alternating-current dynamo-electric machine, a local circuit in which the current varies in phase with variation of phase of the current in said machine, a commutator in said local circuit rotating with the rotating member of said machine, a device having relatively movable members, one of said members being energized by the commutated current in said local circuit and the other being energized by a constant flux, and a switch in the circuit of said machine controlled by said device.

5. In combination, a main alternating-current circuit, a local circuit in which the current varies in phase with variation of phase of the current in the main circuit, a source of direct current, a device energized both by current from said local circuit and current from said source, a commutator adapted and arranged to commutate one of said currents and rotating synchronously and in phase with the electromotive force of the main circuit, and a switch in the main circuit controlled by said device.

6. In combination, an altenating-current dynamo-electric machine, a local circuit in which the current varies in phase with variation of phase of the current in said machine, a source of direct current, a device energized both by current from said local circuit and by current from said source, a commutator adapted and arranged to commutate one of said currents and rotating with the rotating member of said machine, and a switch in the circuit of said machine controlled by said device.

7. In combination, a main alternating-current circuit, a device energized by a constant flux, means for producing in said device a second flux reversible in direction when the current in the main circuit reverses in phase relative to the electromotive force, and a switch in said main circuit controlled by said device.

8. In combination, a main alternating-current circuit, a device energized by a constant flux, means for producing in said device a second flux reversible in direction when the current in the main circuit reverses in phase relative to the electromotive force and independent in strength of variation in current strength in the main circuit over wide ranges, and a switch in the main circuit controlled by said device.

9. In combination, a main alternating-current circuit, a local circuit in which the current varies in phase with variation of phase of the current in the main circuit and is independent in strength of variation in the main current strength over wide ranges, a source of direct current, a device energized both by current from said local circuit and current from said source, a commutator adapted and arranged to commutate one of said currents and rotating synchronously with the cycles of the electromotive force of the main circuit, and a switch in the main circuit controlled by said device.

10. In combination, a main alternating-current circuit, a local circuit in which the current varies in phase with variation of phase of the current in the main circuit and is independent in strength of the strength of the main current over wide ranges, a commutator in said local circuit rotating synchronously with the cycles of the electromotive force of the main circuit, a device having relatively movable members, one of said members being energized by the commutated current in said local circuit and the other member being energized by a constant flux, and a switch in the main circuit controlled by said device.

11. In combination, an alternating-current circuit, a series transformer having its primary included in said circuit and adapted to be saturated by a fraction of the normal current in said circuit, a source of direct current, a device energized both by current from the secondary of said transformer and by current from said source, a commutator adapted and arranged to commutate one of said currents and rotating synchronously with variation of phase of the electromotive force in said circuit, and a switch in said circuit controlled by said device.

12. In combination, an alternating-current dynamo-electric machine, a series transformer having its primary in series with said machine and adapted to be saturated by a fraction of the full-load current of said machine, a commutator connected to the secondary of said transformer and rotating with the rotating member of said machine, a device having relatively movable members, one of said members having a winding connected to said commutator and the other member being energized by a constant flux, and a switch in the circuit of said machine controlled by said device.

13. A device for protection against reversal of energy in an alternating-current circuit, comprising a member energized by a constant flux and a second member movable relatively to the first member and energized by a commutated current varying in phase with variation of phase of the current in said circuit, and a switch in said circuit controlled by said device.

14. A device for protection against reversal of energy in an alternating-current circuit comprising two windings, one energized from a direct-current source and the other from an altenating-current source in which the current varies in phase with variation of phase of the current in said circuit, means for commutating one of said currents, and a switch in said circuit controlled by said device.

15. A reverse-current cut-out for alternating-current circuits comprising a rectifier, and a polarized relay actuated by the rectified current.

16. A reverse-current cut-out for alternating-current circuits comprising a rectifier driven synchronously with the cycles of the electromotive force in said circuit, and a polarized relay actuated by the rectified current.

17. In combination, an alternating-current circuit, a rectifier in said circuit, a polarized relay supplied with current from said rectifier, and a circuit-breaker controlled by said relay.

18. In combination with an alternating-current circuit, a series transformer having its primary included in said circuit and having a core adapted to be saturated by a fraction of the full-load current in said circuit, a rectifier in circuit with the secondary of said transformer, a polarized relay supplied with current from said rectifier, and a circuit-breaker controlled by said relay.

In witness whereof I have hereunto set my hand this 29th day of April, 1904.

LEONARD WILSON.

Witnesses:
J. R. ANDERSON,
H. M. ACLY